United States Patent
Sachs et al.

(10) Patent No.: US 7,489,705 B2
(45) Date of Patent: Feb. 10, 2009

(54) TRANSMISSION CONTROL METHOD IN AN ARQ SYSTEM

(75) Inventors: Joachim Sachs, Aachen (DE); Michael Meyer, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 572 days.

(21) Appl. No.: 10/546,432

(22) PCT Filed: Feb. 26, 2003

(86) PCT No.: PCT/EP03/01970

§ 371 (c)(1),
(2), (4) Date: Aug. 19, 2005

(87) PCT Pub. No.: WO2004/077736

PCT Pub. Date: Sep. 10, 2004

(65) Prior Publication Data

US 2006/0159079 A1    Jul. 20, 2006

(51) Int. Cl.
*H04J 3/16* (2006.01)
*H04J 3/22* (2006.01)
*G06F 11/00* (2006.01)
*G06F 11/30* (2006.01)
*G08C 25/00* (2006.01)
*H03M 13/00* (2006.01)
*H04L 1/00* (2006.01)

(52) U.S. Cl. .................. 370/467; 714/746; 714/749
(58) Field of Classification Search ............. 714/746
See application file for complete search history.

(56) References Cited

U.S. PATENT DOCUMENTS

| 5,210,751 A | 5/1993 | Suzuki et al. ............. 370/94.1 |
| 5,872,777 A | 2/1999 | Boxall et al. ............. 370/349 |
| 2005/0022098 A1* | 1/2005 | Vayanos et al. ............. 714/776 |

FOREIGN PATENT DOCUMENTS

EP    0777396 A1 *    4/1997

* cited by examiner

*Primary Examiner*—Daniel J Ryman
*Assistant Examiner*—Christopher Crutchfield

(57) ABSTRACT

A method of controlling the transmission of a sequence of data symbols over a connection provided by a predetermined communication layer, which method comprises modifying the transmission by identifying (S41) a reference data symbol in the sequence of data symbols, dividing (S42) the data symbol following the reference data symbol in the sequence of data symbols into a sequence of new data units on the basis of a new data unit generation scheme, generating (S43) a new sender-side transmission record by mapping sender-side transmission status information associated with data units in an old sender-side transmission record onto the new data units in accordance with a predetermined mapping scheme for sender-side transmission records, generating (S44) a new receiver-side transmission record by mapping receiver-side transmission status information associated with data units in an old receiver-side transmission record onto the new data units in accordance with a predetermined mapping scheme for receiver-side transmission records, and performing (S45) the transmission control of the new data units on the basis of the new sender-side transmission records, and performing the reassembling of data symbols on the basis of the new receiver-side transmission record.

42 Claims, 6 Drawing Sheets

Data Units

TRANSMISSION CONTROL METHOD IN AN ARQ SYSTEM

FIELD OF THE APPLICATION

The present application relates to a method of controlling the transmission of a sequence of data symbols of a connection provided by a predetermined communication layer, to methods of controlling communication devices performing such a method, and to the corresponding communication devices.

BACKGROUND OF THE INVENTION

In the field of data communications, it is known to use the technique of protocol layering. In protocol layering, when sending data, one layer passes a stream or sequence of data symbols (e.g. bits) to a lower layer, which in turn handles the further transmission, e.g. by passing the data to yet another lower layer, and on the receiving-side, each layer of a protocol hierarchy reassembles received data and passes it upward to a higher layer. A sending entity and receiving entity at a given layer are referred to as a sending peer and receiving peer, respectively. An example of layering is the well-known OSI model. As protocol layering is itself well known in the art, a further explanation is not necessary here.

The communication between a sending peer and a receiving peer provide a connection of the communication layer at which the sending peer and receiving peer reside. For such a connection, it is known to divide the sequence of data symbols to be transmitted into a sequence of data units on the basis of a given data unit generation scheme. It is noted that in connection with various communication protocols, data units have a variety of names, such as packet, frame, segment, block, protocol data unit, etc. The term "data unit" as used in the specification and claims is generic and covers any such division of data symbols.

This is schematically shown in FIG. 1, where a sequence of data symbols, in this case bits of 0 or 1, are placed into a sequence of data units 22. The data units comprise a header 10 and a payload section 11, where the data symbols of the sequence are placed into the payload section 11. The data units 22 form their own sequence, which is indicated by the numbering n, n+1, n+2 . . . , n being an integer. It is noted that the specific structure of a data unit 22 will depend on the specific protocol used, and the shown structure of a header and a payload is only an example, albeit a common one.

The data units 22 of the sequence are sent over a connection 12 to a receiving peer.

A more detailed example is schematically shown in FIG. 2. FIG. 2 shows a first protocol layer Lm, m being an integer, and a higher layer L(m+1). Reference numeral 24 represents a sending peer and reference numeral 25 a receiving peer. In the example of FIG. 2, the sending peer 24 receives data units 21 from the higher layer L(m+1). The higher layer data units 21 consist of data symbols, e.g. bits. In other words, in the example of FIG. 2, a sequence of data symbols to be sent is received in the form of higher layer data units. The sending peer 24 generates data units 22 from the sequence of data symbols contained in the higher layer data units 21. It is noted that in the context of data unit based communication the higher layer data units 21 are sometimes referred to as service data units (SDU) with respect to communication layer Lm, whereas the data units 22 generated by the layer Lm are referred to as protocol data units (PDU). The sending peer 24 passes the data units 22 to a lower layer L(m−1), which processes these as a stream of data symbols in accordance with the specific rules of said lower layer L(m−1), and provides received data units 22' to the receiving peer 25 of layer Lm. From the view point of the sending peer 24 and receiving peer 25, a protocol connection 12 is established for sending the data units 22, as the protocol layer Lm is generally oblivious to the processing conducted at lower layers.

The received data units of layer Lm are referred to as 22', in order to indicate that these data units should ideally be identical to the sent data units 22, but can contain errors. The receiving peer 25 reassembles the higher layer data units on the basis of the data symbols in the received data units 22'. In the example of FIG. 2, it thereby generates data units 21' that are passed to the higher layer L(m+1). Depending on the specific protocol used, the data units 21' are always fully correct copies of the sent higher layer data units 21, or may be data units that also contain errors. This is in itself known in the art and therefore does not need to be described in further detail here.

As a mechanism for improving the quality of transmission between the sending peer 24 and the receiving peer 25, it is known to let the receiving peer 25 send feedback messages 23, which arrive as messages 23' at the receiving peer 24. From the viewpoint of the sending peer 24 and receiving peer 25 of layer Lm, these are again sent over the Lm connection 12. The reference numeral 23' is used to indicate that the received messages 23' may be different from the sent messages 23, e.g. due to transmission errors. These errors may or may not be correctible, e.g. with the help of redundancy information, depending on the specific protocol being used. The structure of the feedback messages and the information contained therein also depends on the specific protocol being used, as is well known in the art. As an example, the feedback messages may have the form of so-called acknowledgments (ACK), in which the correct receipt of a sent data unit 22 is acknowledged and/or the form of non-acknowledgments (NACK), where the receiving peer 25 explicitly identifies a data unit 22 that was not correctly received. It is noted that the acknowledgment messages do not necessarily have to identify the received data unit that triggered the acknowledgment, but e.g. may only identify the last correctly received data unit 22 of the sequence of data units (see FIG. 1). This leads to the phenomenon of so-called duplicate acknowledgments if the data unit following said last correctly received data unit is not correctly received, even though data units subsequent thereto are correctly received.

An example of such a feedback mechanism is the ARQ (Automatic Repeat reQuest) mechanism, which is well known and therefore does not need to be described in further detail. Another example of a feedback mechanism is that the sending peer polls the receiving peer for information on the status of received data units.

When using such a feedback mechanism, in which the feedback messages comprise information on the receipt of data units sent by the sending peer, the sending peer may keep a sender-side transmission record of data units, in which each data unit is associated with sender-side transmission status information. The type of transmission status information kept depends on the specific protocol and possibly the protocol implementation. For example, the transmission status information can simply distinguish between "correctly received" and "not correctly received". It can also be more detailed in additionally distinguishing the status of "not correctly received" into "sent and not correctly received" and "not yet sent". Equally further information can be recorded in association with data units, such as the number of retransmission attempts, reliability information, queuing times, time stamps, or a priority. Again this depends on the specific protocol and the specific implementation.

FIG. 5 shows a schematic representation, in which the sequence of data units are schematically ordered from left to right and from top to bottom. In the example, the marked data units 14, 15, 29, 42, 51 and 53 are associated with the status of "not correctly received". Furthermore, in the example the data units following the ninety-first data unit are associated with the status "not sent".

The transmission control for transmission of data units 22 over the connection 12 provided by communication layer Lm is done on the basis of such a sender-side transmission record. For example, a data unit associated with the status "not correctly received" can be retransmitted under certain conditions. The precise conditions for retransmission can vary from one protocol to another, as is known in the art.

Similar to the sender-side transmission status information, the receiving peer 25 may also keep a receiver-side transmission record of data units, in which each data unit is associated with receiver-side transmission status information. This transmission status information on the receiver-side will depend on the specific protocol and possibly the specific protocol implementation. For example, it can simply consist of distinguishing between the status of "correctly received" and the status of "not correctly received". It can also be more detailed, and e.g. identify different degrees of errors in not correctly received data units. The receiver-side transmission record is used by the receiving peer 25 at least for reassembling the sequence of data symbols contained in the transmitted data units 22

[Problem Underlying the Invention]

In present day communication systems, it is known to perform changes in a connection provided by a given protocol layer such as the protocol layer Lm shown in the example of FIG. 2. Such changes can consist in a reconfiguration of the connection 12 provided between a given pair of peers 24, 25, or can consist in a handover to a new set of peers. Various handover situations are possible, such as an inter-system handover or an intra-system handover, as is known to a person skilled in the art. It is possible that the new peer pair to which the connection is handed over comprises the same sending peer or same receiving peer as the previous connection, but a new corresponding peer. Equally, it is possible that the new peer pair is provided by the same protocol as the previous pair, or by a different protocol of layer Lm.

In the existing technology, when such a change occurs in the connection provided by a given layer (such as the layer Lm shown in the example of FIG. 2), then the known procedures consist in flushing the send buffer and the receive buffer, waiting for further data symbols to arrive from a higher layer, and then continue the transmission on the basis of the changed connection. Due to the buffer flushing, this generally leads to data loss, which has to be recovered by mechanisms of higher layer protocols, e.g. ARQ mechanisms implemented by the layer L(m+1) or higher layers in the example of FIG. 2.

[Object of the Invention]

The object of the invention is to provide an improved way of performing a change in the transmission of a sequence of data symbols or a connection provided by a predetermined communication layer.

SUMMARY OF THE INVENTION

This problem is solved by the methods of the independent claims, and by the communication device of independent claim 49. Advantageous embodiments are described in the respective dependent claims.

Therefore, in accordance with the invention, a transmission of data units at a predetermined communication layer, such as the layer Lm shown in FIG. 2, can be modified by identifying a reference data symbol in the sequence of data symbols, dividing the data symbols following the reference data symbol in the sequence of data symbols into a sequence of new data units on the basis of a new data generation scheme, generating a new sender-side transmission record by a predetermined mapping operation for the transmission status information, and generating a new receiver-side transmission record by mapping the receiver-side transmission status information on the basis of a predetermined mapping scheme. Then, the further transmission control is done on the basis of the new sender-side transmission record and the reassembling of data symbols on the receiver-side is done on the basis of the new receiver-side transmission record. Preferably, the receiver-side transmission record is also used as a basis for generating feedback messages. For example, the receiver-side can generate status reports as a type of feedback, which contain status information on all received data units, e.g. whether they were correctly received or not, and send these status reports to the sender-side. Such status reports can be generated at the initiative of the receiver-side, or in response to requests from the sender-side.

On the basis of the concept of the present invention, the information contained in the sender-side transmission record and the receiver-side transmission record is not lost. Much rather, this information is mapped or transcoded onto a new sender-side transmission record and receiver-side transmission record, respectively. In the prior art, the sender-side transmission record and receiver-side transmission record were simply deleted, such that all this information was lost. In this way, the present invention provides a more efficient procedure that avoids an unnecessary loss of data and consequently an unnecessary retransmission of such data.

BRIEF DESCRIPTION OF FIGURES

The present invention will know be described in more detail on the basis of preferred embodiments, making reference to the attached drawings, in which.

DETAILED DESCRIPTION OF EMBODIMENTS

Figure 1:
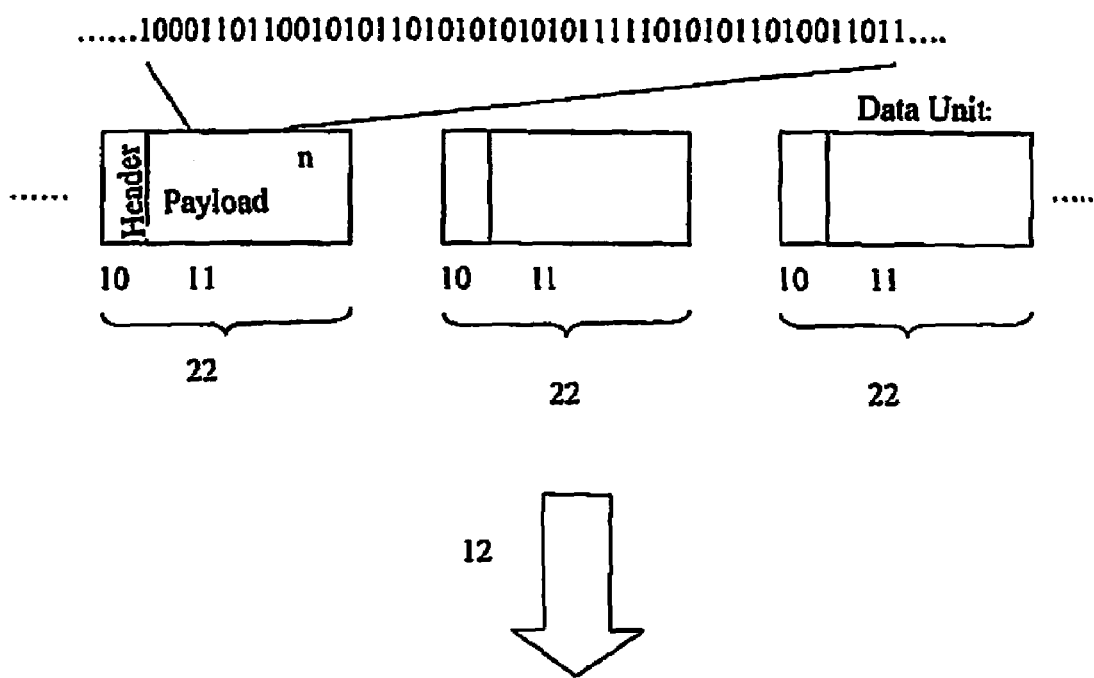
FIG. 1 is a schematic representation of a sequence of data symbols that is divided into a sequence of data units.

As a starting point, a situation as described previously with respect to FIGS. 1 and 2 is considered. Namely, a peer-to-peer connection 12 between a sending peer 24 and a receiving peer 25 at a predetermined communication layer Lm is provided. The connection 12 serves to transmit a sequence of data symbols. It is noted that the data symbols may be provided in the form of higher layer data units 21, but they can also be provided in any other way, e.g. simply as a stream that has no recognisable further structure. The sequence of data symbols can use any type of data symbol and any basic representation, i.e. can be binary, ternary, etc. For example, the data symbols can be bits.

A connection is assumed in which data units 22 generated according to a predetermined scheme are sent, and a feedback mechanism is implemented according to which the receiving peer 25 sends feedback messages 23 to the sending peer 24, where the feedback messages 23 comprise information on the receipt of the data units 22. The sending peer 24 keeps a sender-side transmission record and the receiving peer 25 keeps a receiver-side transmission record as described previously.

Figure 4:
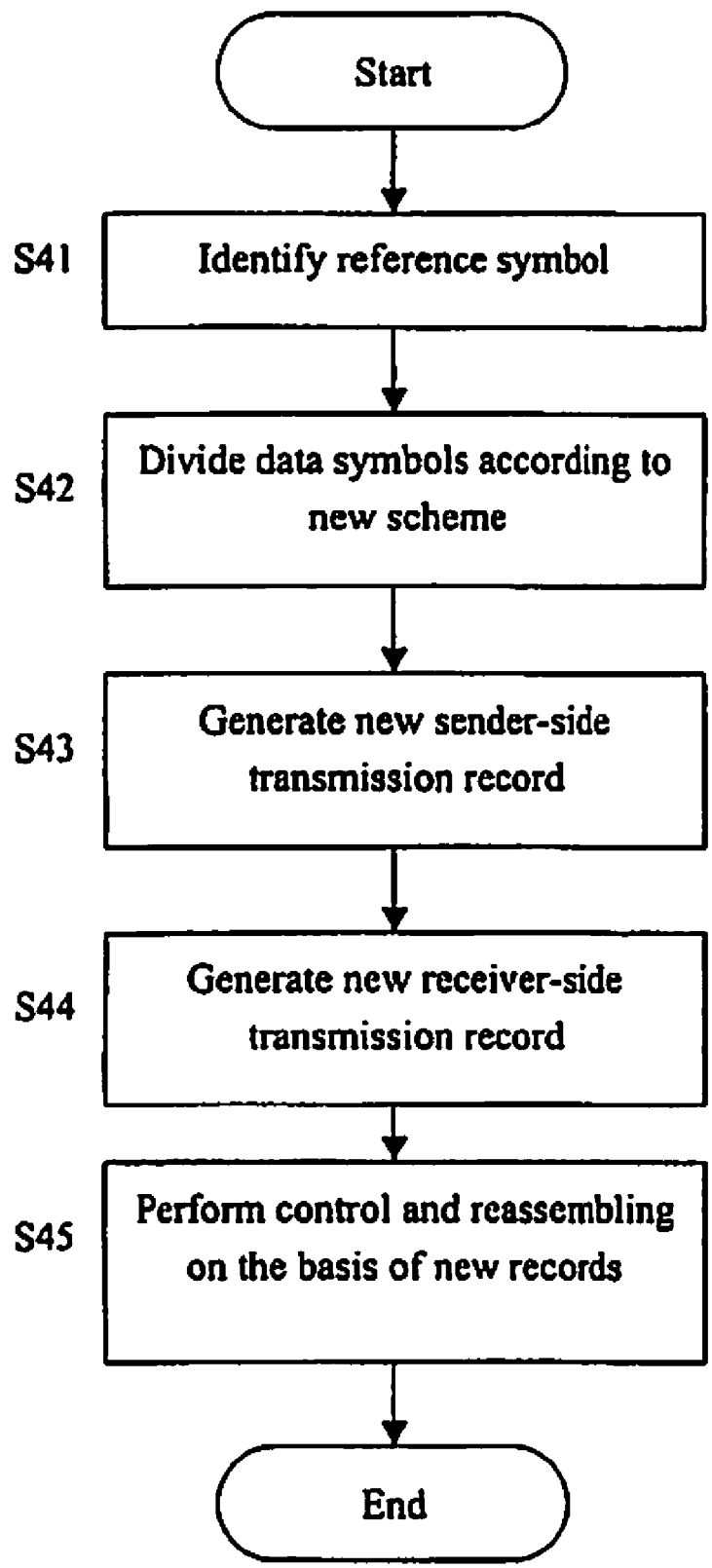
FIG. 4 shows a flow chart of a basic embodiment according to the present invention.

In the embodiment shown in FIG. 4, it is assumed that a modification of the transmission of data symbols has occurred. The modification can be triggered by a variety of events, such as a reconfiguration of a given peer-to-peer connection or a handover from a first peer pair to another peer pair. In reaction to such an event, the procedure shown in FIG. 4 is started. In a first step S41, a reference symbol among the sequence of data symbols is identified. Any suitable or desirable way of selecting a given data symbol can be chosen. For example, the data symbol can be chosen on the basis of the existing sender-side transmission record and/or receiver-side transmission record. For example, the first data symbol of the lowest not correctly received data unit in the sequence of data units can be chosen. Looking at the example of FIG. 5, this would be the first data symbol of data unit number 14. However, the reference data symbol can also be selected on the basis of other structures, e.g. the higher layer data units 21 on the basis of which the sending peer 24 generates the data units 22. If the higher layer data units provided to the predetermined communication layer Lm are used as a basis for defining the reference symbol, it is preferable to determine the first data symbol of the higher layer protocol data unit that follows the last higher layer protocol data unit of which all data symbols were correctly received by the receiving peer as the reference data symbol. In other words, the reference data symbol is chosen to be the first data symbol of the higher layer data unit L(m+1) (data unit 21) that the receiving peer 25 is in the process of receiving, but has not yet fully and correctly received.

Although the above examples showed cases where the reference data symbol is chosen on the basis of a structure that contains a plurality of such data symbols, it is in principle possible to choose any arbitrary data symbol. In other words, the reference data symbols can also be a data symbol lying within a data unit of the present sequence of data units.

Returning to FIG. 4, the procedure for modifying the transmission of data symbols continues with step S42, in which the data symbols following the reference data symbol in the sequence of data symbols being transmitted, are divided into a new sequence of new data units on the basis of a new data unit generation scheme. The specifics of the new data unit generation scheme will depend on the underlying reason for modifying the transmission, e.g. reconfiguration or handover. For example, the difference between the initial data unit generation scheme and the new data generation scheme can consist in the fact that the new data unit generation scheme comprises generating the second data units with a predetermined size different from the size of the initial data units. As an example, a transition from an old data unit size of 40 bytes to a new data unit size of 70 bytes can be performed. Naturally, this is only an example, and arbitrary new data unit generation schemes are possible. For example, the new data unit generation scheme can involve variable data unit sizes.

Then, in step S43, a new sender-side transmission record is generated by mapping the sender-side transmission status information associated with data units in the old sender-side transmission record onto the new data units in accordance with a predetermined mapping scheme for sender-side transmission records. In other words, the information associated with the old data units is mapped or transcoded onto the new data units. The mapping scheme itself can be chosen in any suitable or desirable way. Namely, the mapping scheme will on the one hand depend on the type of information contained in the transmission status information, and will also depend on the desires and requirements associated with the specific communication layer and the involved protocols.

As an example, if the sender-side transmission status information distinguishes between the statuses of "correct receipt confirmed" and "correct receipt not confirmed", then the mapping scheme for the sender-side transmission records may comprise: mapping the status of "correct receipt not confirmed" onto each new data unit that contains at least one data symbol that belonged to an old data unit that was associated with the status of "correct receipt not confirmed", and mapping the status of "correct receipt confirmed" onto each new data unit that completely contains data symbols that all belonged to old data units that were associated with the status of "correct receipt confirmed".

This means that if a new data unit contains a single data symbol that belonged to a non-confirmed old data unit, then the new data unit is also considered not confirmed.

As a further example, if the status of "correct receipt not confirmed" is further distinguished into "sent and correct receipt not confirmed" and "not sent", then the mapping scheme for sender-side transmission records may comprise: mapping the status of "not sent" onto each new data unit that contains at least one data symbol that belonged to an old data unit that was associated with the status of "not sent", and mapping the status of "sent and correct receipt not confirmed" onto each new data unit that contains at least one data symbol that belong to an old data unit that was associated with the status of "sent and correct receipt not confirmed" and that contains no data symbols that belonged to an old data unit that was associated with the status of "not sent".

In other words, if a new data unit contains a single data symbol that belonged to an old data unit that was not yet sent, then the new data unit is also associated with the status of "not sent". Thereby, the state of "not sent" takes priority over the state of "sent and correct receipt not confirmed". However, it is noted that this is only one possibility, and other concepts are possible. For example, it is also possible to implement a type of majority decision in such a way that if a new data unit consists of data symbols that belonged to old data units respectively having the statuses of "sent and correct receipt not confirmed" as well as "not sent", then the new data unit may be associated with the status that the majority of data symbols belonged to.

Returning to the embodiment of FIG. 4, subsequent to step S43, the procedure goes to step S44, in which a new receiver-side transmission record is generated by mapping the receiver-side transmission status information associated with the old data units in the old receiver-side transmission record onto the new data units in accordance with a predetermined mapping scheme for receiver-side transmission records.

Similar to the mapping scheme for the sender-side transmission records, the mapping scheme for the receiver-side transmission records can be chosen as is suitable or desirable. The specifics will depend on the type of information carried by the receiver-side transmission status information, and by the desires and requirements associated with the given communication layer and the involved protocols. For example, if the receiver-side transmission status information distinguishes between "correctly received" and "not correctly received", then the mapping scheme for receiver-side transmission records may comprise: mapping the status of "not correctly received" onto each new data unit that contains at least one data symbol that belongs to an old data unit that was associated with the status of "not correctly received", and mapping the status of "correctly received" onto each new data unit that completely contains data symbols that all belonged to old data units that were associated with the status of "correctly received".

In other words, in this example, if a new data unit contains a single data symbol that belonged to an old data unit that was not correctly received, then the new data unit is also associated with the status of "not correctly received".

Figure 5:
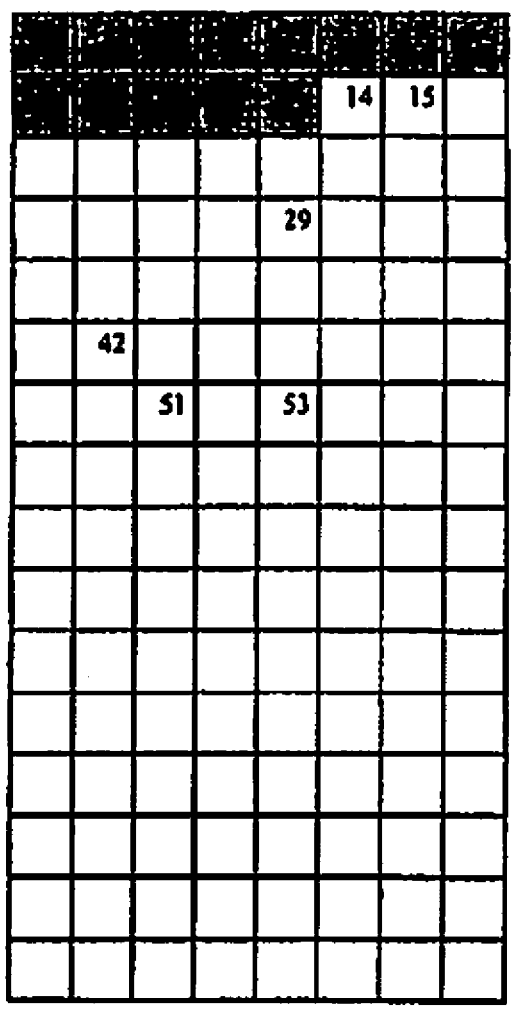
FIG. 5 shows a schematic representation of a sender-side transmission record.
Figure 6:
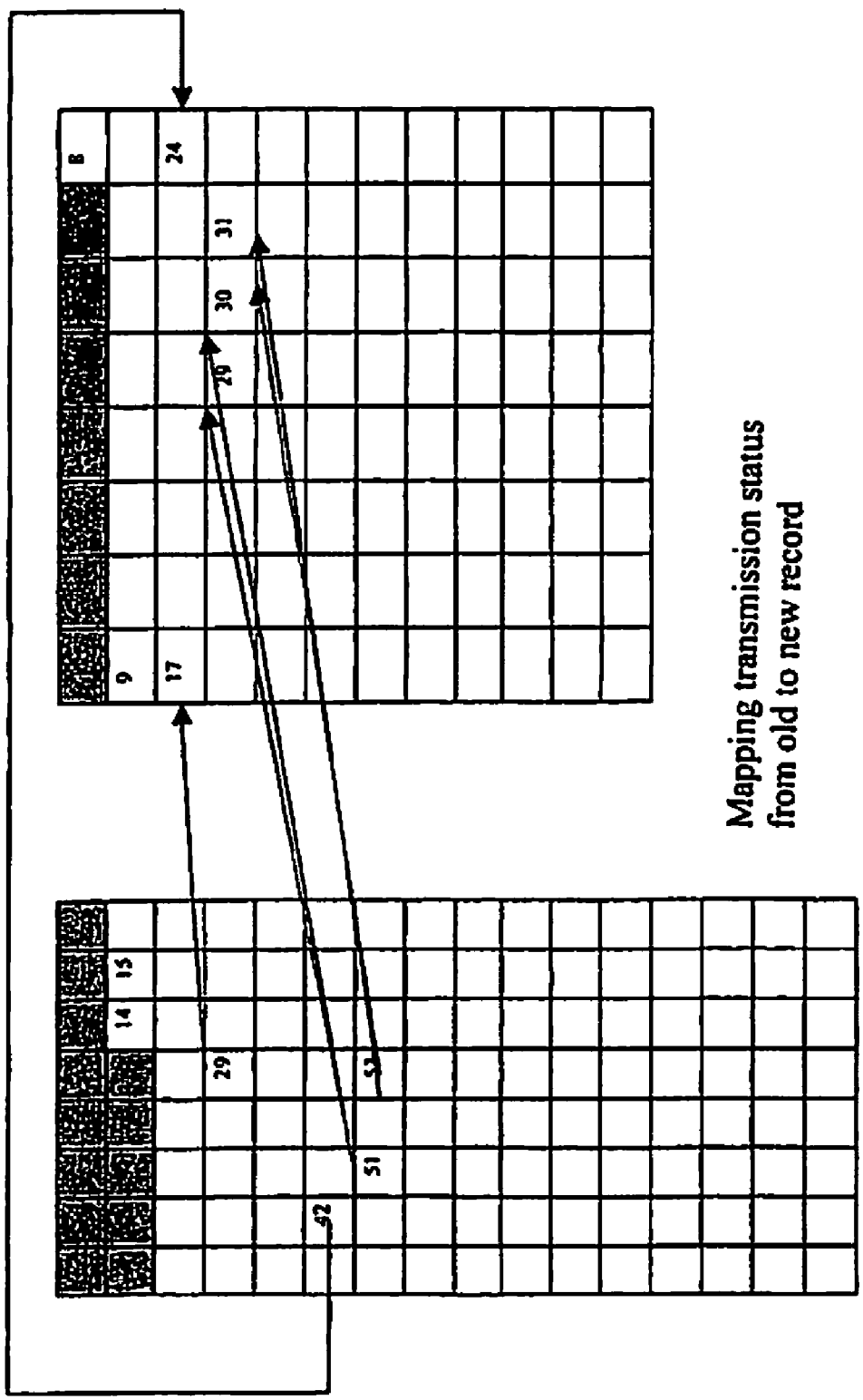
FIG. 6 shows a schematic representation of the mapping of an old transmission record onto a new transmission record.

FIG. 6 schematically shows the mapping of transmission status information from an old record to a new record, where the old record is the example already shown in FIG. 5. In the example, the new data unit generation scheme after modification of the transmission is to generate blocks of 70 bytes for the sequence of data symbols, where the old generation scheme was to generate blocks of 40 bytes length. As can be seen, the status of "correct receipt not confirmed" associated with the old data units 14 and 15 is mapped onto the new data units 8 and 9, and equally the status of "correct receipt not confirmed" associated with old data units 29, 42, 51 and 53 is mapped onto new data units 17, 24 and 29 to 31. This is a direct result of a mapping of data symbols that operates in such a way that the first new data unit that is 70 bytes long, contains the first old data unit (40 bytes long) and 30 bytes of the second old data unit. The second new data unit contains the remaining 10 data units of the second old data unit, the 40 bytes of the third old data unit and the first 20 bytes of the fourth old data unit, etc. The specific mapping of the status of "correct receipt not confirmed" is done as described above, namely that the status of "correct receipt not confirmed" is mapped onto each new data unit that contains at least one data symbol that belongs to an old data unit, that was associated with the status of "correct receipt not confirmed".

It may be noted that the type of information contained in the transmission status information can be more than just the above mentioned examples, can also e.g. comprise information on one or more of a time value associated with a data unit (such as a time stamp), a number of retransmission attempts associated with the data unit, reliability associated with a data unit, and the priority or importance associated with a data unit. An example of reliability information associated with a data unit can be based on the outcome of a decoder that takes into account error correction information contained in the data unit and also outputs an evaluation of the reliability. An example of priority information is a simple scheme according to which each data unit is associated with one of a predetermined number of priority values, e.g. "low", "medium", "high" and "no priority indicated". The mapping of such additional information within a mapping scheme can again be performed in any suitable or desirable way, depending on the specific desires and requirements. For example, a time value associated with old data units can be mapped onto new data units according to a majority decision of the above indicated type, namely that the new data unit is associated with the time value with which the majority of data symbols contained in said new data unit was associated within old data units. Regarding the mapping of the number of retransmission attempts, this can be done in such a way that a new data unit is associated with the highest number of retransmission attempts of each data symbol contained in the new data unit, or in contrast thereto with the lowest. In general, a sending peer will be arranged to only attempt a predetermined maximum number of retransmissions, e.g. five. Therefore, when choosing the former option, this leads to a transmission control that will provide a decrease in reliability, but also a decrease in delay, because some data symbols that were contained in an old data unit for which the maximum number of retransmissions was not attempted, may be associated with a larger number of retransmission attempts in a new data unit, such that the maximum number of retransmission attempts is never undertaken for such data symbols. The latter option will increase delay, but will also increase reliability, as some data symbols may in fact be retransmitted more often than the maximum number. Depending on whether retransmission is to be encouraged or discouraged, the selection of the mapping option can be conducted. Similar choices are available for the mapping of reliability information. Namely, if the reliability information is such that it indicates different degrees of reliability, then a new data unit can be associated with the highest reliability of any of the data symbols contained therein, or with the lowest. As a further alternative, it is possible to calculate a type of average reliability based on the reliabilities associated with the data symbols contained in the new data unit. Similar choices are also available for the mapping of priority information. Namely, if the priority information is such that it indicates different degrees of priority, then a new data unit can be associated with the highest priority of any of the data symbols contained therein, or with the lowest. As a further alternative, it is possible to calculate a type of average priority based on the priorities associated with the data symbols contained in the new data unit.

Returning to FIG. 4, the procedure finally goes to step S45, in which the control operation for the transmission control and for the reassembly of received data symbols is resumed on the basis of the newly generated transmission records. In other words, the transmission control of the new data units is performed on the basis of the new sender-side transmission record and the reassembly of the sequence of data symbols at the receiver-side is conducted on the basis of the new receiver-side transmission record.

Preferably, the receiver-side transmission record is also used as a basis for generating feedback messages. In this way, the transmission control is also based on the receiver-side transmission record. For example, the receiver-side can generate status reports as a type of feedback, which contain status information on all received data units, e.g. whether they were correctly received or not, and send these status reports to the sender-side. Such status reports can be generated at the initiative of the receiver-side, or in response to requests from the sender-side.

It should be noted that the method shown in FIG. 4 is only an example, and that variations are possible. For example, steps S43 and S44 can be conducted in a different order, or in parallel.

As already mentioned earlier, the reasons for modifying the transmission can be manifold. In the following, a number of different cases for modifying the transmission will be discussed.

Figure 2:
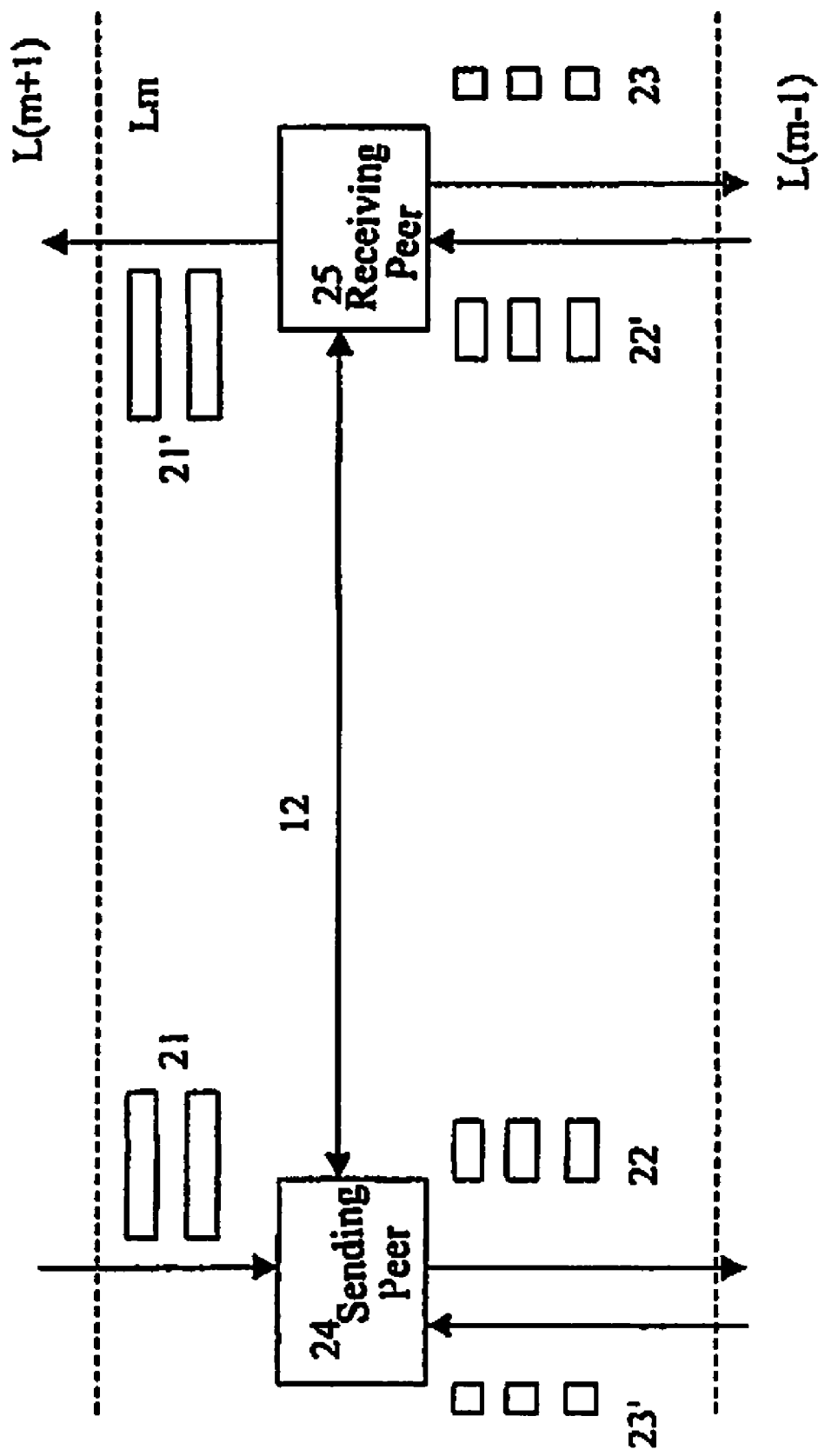
FIG. 2 is a schematic representation of a sending peer and receiving peer at a given communication layer.

As a first example, the transmission can be modified due to a reconfiguration of the connection provided by the predetermined communication layer Lm (see FIG. 2). In this case, the sending peer 24 and receiving peer 25 do not change. In other words, it is the same peer pair 24, 25 that conducted the transmission of the old data units on the basis of the old transmission records that then conducts the transmission of the new data units on the basis of the new transmission records. In this case, the operation of generating the new sender-side transmission record is preferably done in the communication device that provides the sending peer, and the generation of the new receiver-side transmission record is done in the communication device that provides the receiving peer. In this connection, it is generally observed that a given communication device, such as a mobile station or a fixed station of a mobile communication system, can provide one or more peers of one or more communication protocols. In other words, a peer is e.g. a functionality provided by software in the communication device.

It is noted that although it is preferable to conduct the generation of the new receiver-side transmission record on the receiver-side, and the generation of the new sender-side transmission record on the sender-side, this is not a necessity. Namely, it is also possible that the communication device providing the sending peer sends the old transmission record to a dedicated location (e.g. a dedicated network node), and that the communication device providing the receiving peer also sends the receiver-side transmission record to said dedicated location, where the appropriate generation of new transmission records is conducted. These new transmission records are then provided to the sending and receiving peer.

Figure 3:
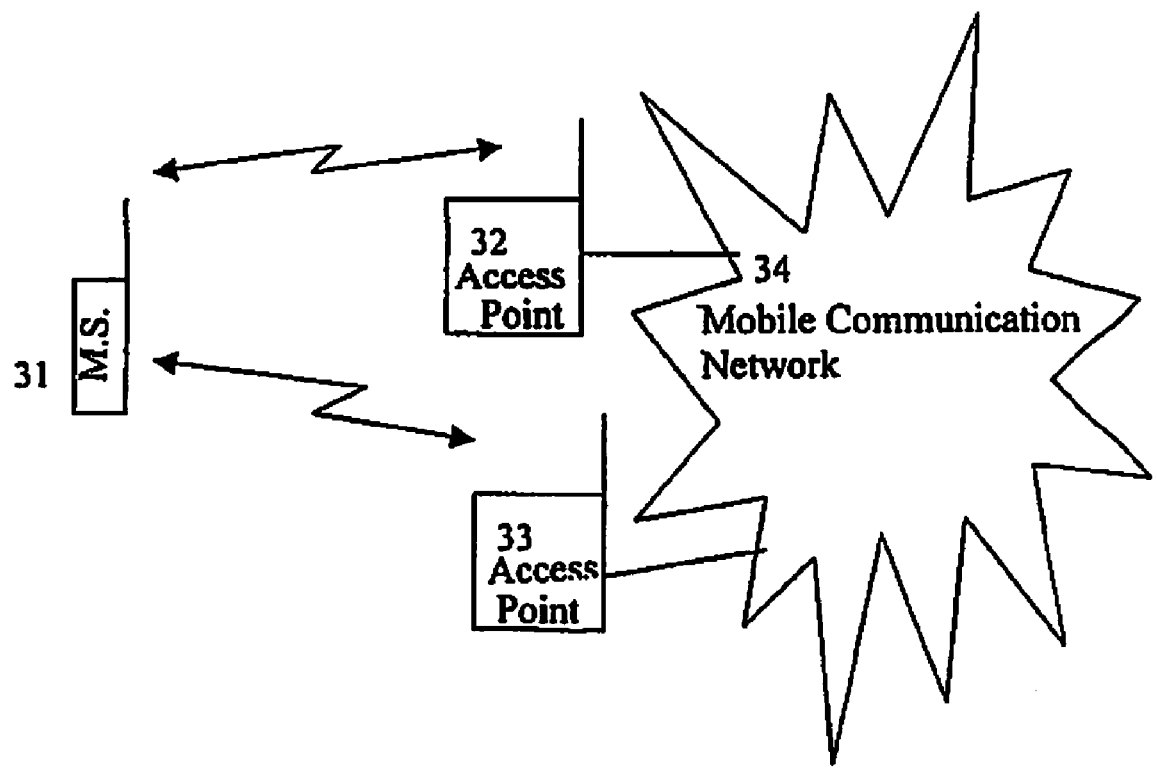
FIG. 3 schematically shows a configuration of communication devices.

Another example that can lead to a modification of the transmission is a handover. FIG. 3 schematically shows an example, in which a handover can occur. Reference numeral 31 refers to a mobile station arranged to communicate with a mobile communication network 34 over a first access point 32 and a second access point 33. It is noted that this is only a schematic representation for explaining a handover, and a real communication network will comprise a far larger number of access points and a far larger number of mobile stations.

In the example of FIG. 3, it is assumed that the mobile station 31 can communicate with the first access point 32 and/or the second access point 33. In general, it will only communicate with one of the access points. The access points can be of the same type, e.g. two base stations, or they can be of different type, e.g. the first access point provides access in accordance with a first communication protocol or communication system, whereas the second access point 33 provides access in accordance with a second protocol or communication system. An example of the latter case is when the first access point is a base station operating in accordance with the overall communication standard of network 34, e.g. GSM, GPRS or UMTS, whereas the second access point 33 is e.g. a wireless LAN (WLAN).

In such an environment, it is possible that a handover of the Lm connection (see FIG. 2) occurs. When the handover takes place, the Lm layer communication handled by the peer pair 24, 25 is given to a new peer pair, which new peer pair then performs the transmission control on the basis of the new transmission records.

It is noted that the handover from the old peer pair to the new peer pair does not necessarily imply that the communication devices involved are changed. Namely, it is possible that the same communication devices provide the first peer pair and the second peer pair. For example, looking at the example of FIG. 3 it is possible that the mobile unit 31 provides a first sending peer and the access point 32 provides a first receiving peer, and after a handover the mobile unit 31 provides a second sending peer different from the first sending peer, and the access point 32 provides a second receiving peer different from the first receiving peer. In such an event, i.e. if the communication devices involved do not change, it is not necessary to transfer any buffer content.

On the other hand, it is equally possible that the handover involves a change in one or two communication devices. In the example of FIG. 3, it is e.g. that the handover involves moving the Lm connection from between mobile unit 31 and access point 32 to between mobile unit 31 and access point 33. In other words, while mobile unit 31 provides the first and possibly the second sending peer (in the course of the handover the sender-side at the mobile unit may retain the same sending peer or switch to a new sending peer), the first access point 32 provides the first receiving peer and the second access point 33 provides the second receiving peer. In this case, the receiving buffer is also handed over from the first access point 32 to the second access point 33 as a part of the modification of the transmission.

As can be seen from the above examples, the new peer pair after the handover can comprise the old sending peer or the old receiving peer, together with a new peer different from the old sending peer and the old receiving peer, or it can comprise two new peers different from both the old sending and the old receiving peer.

As already mentioned previously, it is possible to perform the generation of the new sender-side transmission record and/or of the new receiver-side transmission record at a dedicated location different from the first or second peer pair. However, in connection with a handover from a first peer pair to a second peer pair to a second peer pair, it is preferable to perform the modification in such a way that the new sender-side transmission record is generated at the old sending peer and transferred to the new sending peer of the new peer pair and the new receiver-side transmission record is generated at the old receiving peer and transferred to the new receiving peer of the new peer pair, or alternatively to perform the modification in such a way that the old sender-side transmission record is transferred from the old sending peer to the new sending peer of the new peer pair, where the new sender-side transmission record is generated, and to transfer the old receiver-side transmission record from the old receiving peer to the new receiving peer of the new peer pair, where the new receiver-side transmission record is then generated.

As noted before, the step of identifying the reference data symbol can be performed in any suitable or desired way. Preferably, this step is performed by the receiving-side of the connection under consideration, i.e. by the receiving peer in the event of a connection reconfiguration, or by the old receiving peer and/or new receiving peer in the event of a handover. After the receiving-side of the connection has identified the reference data symbol, the sending-side of the connection (sending peer in the event of a reconfiguration, old sending peer and/or new sending peer in the event of a handover) is notified of the identified reference symbol by a message sent from the receiving-side to the sending side.

Attention is drawn to the fact that the concept of the present invention is independent of any specific technique for controlling the transmission of data units over the connection provided by the predetermined communication layer. For example, this transmission control can be done on the basis of a sliding-window technique, on the basis of a rate-based technique, etc. In the event that a sliding-window technique is used, it is preferable to select the reference data symbol as the initial low end of the sliding-window with respect to the sequence of data symbols, when transmission control is started on the basis of the new data units and the new sender-side transmission record.

In the example shown in FIG. 6, the amount of data symbols contained in the old data units was constant (40 bytes in the example). However, the concept of the present invention is by no means restricted in this way. Namely, the invention can also be applied in the context of a system where the number of data symbols contained in the old data units is variable. In other words, the invention can also be applied when the payload size (reference numeral 11 in FIG. 1) in the old data units is variable. In this case, the preferred embodiment of the invention is arranged in such a way that if the new receiver-side transmission record is generated at the receiver-side of the connection, then the sender-side of the connection transmits to the receiver-side information on how many data symbols are contained in each of the old data units that the receiver-side has not correctly received.

The sender-side can transmit this information based on its old sender-side transmission record, namely if the sender-side transmission record keeps the status information of "correct receipt not confirmed", or the receiver-side first sends a request message to the sender-side, where the request message indicates which old data units have not been correctly received by the receiver-side. As in the description above, the term "sender-side" refers to the sending peer in the event of a reconfiguration, and the old sending peer and/or new sending peer in the event of a handover, and the term "receiver-side" refers to the receiving peer in the event of a reconfiguration and the old receiving peer and/or new receiving peer in the event of a handover.

As can be seen from the above description of a method for controlling a transmission over a connection provided by a predetermined communication layer, the present invention also relates to methods of controlling communication devices and to such communication devices themselves.

For example, the invention also thereby relates to a method and communication device arranged to operate as a sending peer of a connection provided by a predetermined communication layer for transmitting a sequence of data symbols. The method and device are arranged for dividing a sequence of data symbols into a sequence of first (i.e. old) data units on the basis of a first data unit generation scheme and controlling the sending of the first data units to a receiving peer of the connection on the basis of a first (old) sender-side transmission record of data units, in which each data unit is associated with sender-side transmission status information. More specifically, the method and communication device are arranged for modifying the transmission of data symbols by obtaining a reference data symbol in the sequence of data symbols, dividing the data symbols following the reference data symbol in the sequence of data symbols into a sequence of second (i.e. new) data units on the basis of a second data unit generation scheme, generating a second (new) sender-side transmission record by mapping the sender-side transmission status information associated with data units in the first sender-side transmission record onto the second data units in accordance with a predetermined mapping scheme for sender-side transmission records and then controlling the sending of the second data units on the basis of the second sender-side transmission record.

The various possibilities for performing the dividing of data symbols and for generating a new sender-side transmission record are as described earlier. Consequently, a renewed description is not necessary. However, it is noted that the obtaining of a reference data symbol can be done in any desired or suitable way, e.g. the reference data symbol can be generated by the communication device acting as a sending peer, or can be received from another source such as from a dedicated point in a communication network, or from the receiver-side. As in the examples described earlier, it is preferable that the receiver-side communicates the reference data symbol to the communication device that operates as a sending peer.

Furthermore, the present invention also relates to a method for controlling a communication device and to a communication device arranged to operate as a new sending peer after a handover. In this way, the method and communication device are arranged for receiving from a previous sending peer of a connection a sequence of data symbols and a first (old) sender-side transmission record of data units that were generated in accordance with a first data unit generation scheme. Furthermore, the method and communication device are arranged for obtaining a reference data symbol in the sequence of data symbols, e.g. with a procedure implemented in said communication device, or from a different source, such as the receiver-side. Then the method and communication device are arranged as described previously, namely to divide the data symbols following the reference data symbol in the sequence of data symbols into a sequence of second (new) data units on the basis of a second data unit generation scheme, generating a second sender-side transmission record by mapping the sender-side transmission status information associated with data units in the first sender-side transmission record onto the second data units in accordance with a predetermined mapping scheme for sender-side transmission records, and then controlling the sending of the second data units over the connection on the basis of the second sender-side transmission record.

The possible and preferred embodiments for obtaining the reference data symbol, dividing the data symbols and mapping the old transmission record into the new transmission record are as described previously, such that a renewed description is not necessary.

Furthermore, the present invention relates to a method of controlling a communication device to operate as a receiving peer of a connection provided by a predetermined communication layer, and to a corresponding communication device, where the method and communication device are arranged for conducting a first (old) transmission by keeping a first (old) receiver-side transmission record of first data units, and reassembling the sequence of data symbols on the basis of this first receiver-side transmission record.

Possibly, the first receiver-side transmission record is also used for generating feedback messages to the receiver-side. Furthermore, the method and communication device are arranged for modifying the transmission of data symbols by obtaining a reference data symbol in the sequence of data symbols, dividing the data symbols following the reference data symbols in the sequence of data symbols into a sequence of second (new) data units on the basis of a second data unit generation scheme, generating a second receiver-side transmission record by mapping the receiver-side transmission status information associated with data units in the first receiver-side transmission record onto the second data units in accordance with a predetermined mapping scheme for receiver-side transmission record, and reassembling the sequence of data symbols on the basis of the second receiver-side transmission record. Again, the second receiver-side transmission record may additionally be used for generating feedback messages to the receiver-side.

The possible and preferred embodiments for obtaining a reference data symbol, dividing the data symbols, and generating a new receiver-side transmission record are as in the previously described embodiments, such that a renewed description is not necessary. However, it is noted that it is preferable that the communication device acting as a receiving peer performs the procedure for identifying a reference data symbol, such that the communication device operating as a receiving peer obtains the reference data symbol with a procedure operated at said communication device.

Furthermore, the present invention relates to a method of controlling a communication device to operate as a receiving peer of a connection provided by a predetermined communication layer, and to a corresponding communication device, which is arranged to receive from a previous receiving peer of the connection a sequence of data symbols and a first receiver-side transmission record. Furthermore, the device and method are arranged for obtaining a reference data symbol in the sequence of data symbols, dividing the data symbols following the reference data symbol in the sequence of data symbols into a sequence of second data units on the basis of a second data unit generation scheme, generating a second receiver-side transmission record by mapping the receiver-side transmission status information associated with data units in the first receiver-side transmission record onto the second data units in accordance with a predetermined mapping scheme for receiver-side transmission records, and reassembling the sequence of data symbols on the basis of the second receiver-side transmission record. The second receiver-side transmission record may additionally be used for generating feedback messages to the receiver-side.

The possible and preferred embodiments for obtaining a reference status symbol, dividing the data symbols and generating the second receiver-side transmission record are as described previously, such that a renewed description is not necessary.

Furthermore, the present invention relates to a method of controlling a communication device to operate as a sending peer of a connection provided by a predetermined communication layer for transmitting a sequence of data symbols, a feedback mechanism being implemented for said connection, according to which a receiving peer of the connection sends feedback messages to a sending peer of the connection, said feedback messages comprising information on the receipt of data units sent over the connection, said method and device being arranged for receiving from a previous sending peer of said connection a sequence of data symbols and a (new) sender-side transmission record of data units that were generated in accordance with a given data unit generation scheme, in which record each data unit is associated with sender-side transmission status information, where the previous sending peer generated the new transmission record on the basis of an old transmission record, as described previously. The method and device are furthermore arranged for dividing the data symbols into a sequence of data units on the basis of the given data unit generation scheme, and then controlling the sending of said data units over said connection on the basis of said received sender-side transmission record. It is noted that the control on the basis of the received sender-side transmission record is the initial control, as this sender-side transmission record will be modified in the course of the process of sending further data units and receiving corresponding feedback messages.

Furthermore, the present invention relates to a method of controlling a communication device to operate as a receiving peer of a connection provided by a predetermined communication layer for transmitting a sequence of data symbols, a feedback mechanism being implemented for said connection, according to which a receiving peer of the connection sends feedback messages to a sending peer of the connection, said feedback messages comprising information on the receipt of data units sent over the connection, said method and device being arranged for receiving from a previous (old) receiving peer of said connection a sequence of data symbols and a new receiver-side transmission record of data units that were generated in accordance with a predetermined data unit generation scheme, in which record each data unit is associated with receiver-side transmission status information, and where the old receiving peer generated the new receiving-side transmission record. The method furthermore comprises receiving from a sending peer of said connection data units generated according to said predetermined data unit generation scheme, and then reassembling said sequence of data symbols on the basis of said second receiver-side transmission record. In other words, the communication device acting as a receiving peer receives the receiver-side transmission record to be used from a previous receiving peer of the connection. It is noted that the control on the basis of the received receiver-side transmission record is the initial control, as this receiver-side transmission record will be modified in the course of the process of receiving further data units and sending corresponding feedback messages.

Furthermore, the present invention relates to a method of controlling a communication device to operate as a sending peer of a connection provided by a predetermined communication layer for transmitting a sequence of data symbols, a feedback mechanism being implemented for said connection, according to which a receiving peer of the connection sends feedback messages to a sending peer of the connection, said feedback messages comprising information on the receipt of data units sent over the connection, said method and device being arranged for conducting said transmission by dividing said sequence of data symbols into a sequence of first data units on the basis of a first data unit generation scheme, controlling the sending of said first data units to a receiving peer of said connection on the basis of a first sender-side transmission record of data units in which each data unit is associated with sender-side transmission status information, characterized by modifying said transmission of data symbols by transferring to another communication device a sequence of data symbols and a sender-side transmission record. The sender-side transmission record transferred to the other communication device can be the first (old) sender-side transmission record, or the second (new) sender-side transmission record. In the latter case, modifying said transmission further comprises obtaining a reference data symbol in the sequence of data symbols, dividing the data symbols following said reference data symbol in the sequence of data symbols into a sequence of second data units on the basis of a second data unit generation scheme, generating a second sender-side transmission record by mapping said sender-side transmission status information associated with data units in said first sender-side transmission record onto said second data units in accordance with a predetermined mapping scheme for sender-side transmission records.

The possible and preferred embodiments for obtaining a reference status symbol, dividing the data symbols and generating the second receiver-side transmission record are as described previously, such that a renewed description is not necessary.

Furthermore, the present invention relates to a method of controlling a communication device to operate as a receiving peer of a connection provided by a predetermined communication layer for transmitting a sequence of data symbols, a feedback mechanism being implemented for said connection, according to which a receiving peer of the connection sends feedback messages to a sending peer of the connection, said feedback messages comprising information on the receipt of data units sent over the connection, said method and device being arranged for conducting said transmission by receiving from a sending peer of said connection data units generated according to a predetermined data unit generation scheme, and reassembling said sequence of data symbols on the basis of a first (old) receiver-side transmission record, characterized by modifying said transmission of data symbols by transferring to another communication device a sequence of data symbols and a receiver-side transmission record. The receiver-side transmission record transferred to the other communication device can be the first (old) receiver-side transmission record, or the second (new) receiver-side transmission record. In the latter case, modifying said transmission further comprises obtaining a reference data symbol in the sequence of data symbols, dividing the data symbols following said reference data symbol in the sequence of data symbols into a sequence of second data units on the basis of a second data unit generation scheme, generating a second receiver-side transmission record by mapping said receiver-side transmission status information associated with data units in said first receiver-side transmission record onto said second data units in accordance with a predetermined mapping scheme for receiver-side transmission records.

The possible and preferred embodiments for obtaining a reference status symbol, dividing the data symbols and generating the second receiver-side transmission record are as described previously, such that a renewed description is not necessary.

It is noted that the above-described entities namely sending peers and receiving peers can be provided by hardware, software or any suitable combination of hardware and software. As such, the methods for controlling communication devices according to the present invention can also be provided in the form of a computer program or computer program product capable of providing the control methods when executed on communication devices capable of running the computer program. Also, the present invention can thereby be embodied in the form of a data carrier holding such a computer program or computer program product.

The communication devices of the present invention can be any communication devices arranged for implementing the above described methods. However, the communication device of the present invention is preferably part of a mobile communication system, e.g. a mobile unit or a fixed unit of such a mobile communication system, as reconfigurations and/or handovers of the above-mentioned kind are more likely to appear in such mobile communication systems.

Although the present invention has been described on the basis of detailed embodiments, the present invention is by no means restricted to these detailed embodiments, which only serve to provide a more comprehensive understanding. Much rather, the scope of the present invention is defined by the appended claims. Reference numerals in the claims serve to make the claims easier to read, but are not restrictive.

The invention claimed is:

1. A method of controlling the transmission of a sequence of data symbols over a connection provided by a predetermined communication layer, said connection having a sending peer and a receiving peer, said predetermined sequence of data symbols being divided into a sequence of first data units on the basis of a first data unit generation scheme, said first data units being sent from said sending peer to said receiving peer, a feedback mechanism being implemented according to which the receiving peer sends feedback messages to the sending peer, said feedback messages comprising information on the receipt of data units sent by said sending peer, the sending peer keeping a first sender-side transmission record of data units in which each data unit is associated with sender-side transmission status information, the receiving peer keeping a first receiver-side transmission record of data units in which each data unit is associated with receiver-side transmission status information, the transmission control for transmission of data units over said connection being done on the basis of said sender-side transmission record, and reassembling said sequence of data symbols being done on the basis of said receiver-side transmission record, said method comprising modifying said transmission by
   identifying a reference data symbol in the sequence of data symbols,
   dividing the data symbols following said reference data symbol in the sequence of data symbols into a sequence of second data units on the basis of a second data unit generation scheme,
   generating a second sender-side transmission record by mapping said sender-side transmission status information associated with data units in said first sender-side transmission record onto said second data units in accordance with a predetermined mapping scheme for sender-side transmission records,
   generating a second receiver-side transmission record by mapping said receiver-side transmission status information associated with data units in said first receiver-side transmission record onto said second data units in accordance with a predetermined mapping scheme for receiver-side transmission records, and
   performing the transmission control of said second data units on the basis of said second sender-side transmission record and performing the reassembling of said sequence of data symbols on the basis of said second receiver-side transmission record.

2. The method of claim 1, wherein said sender-side transmission status information distinguishes between at least the statuses of
   correct receipt confirmed, and
   correct receipt not confirmed, said receiver-side transmission status information distinguishes between at least the statuses of
   correctly received, and
   not correctly received, said mapping scheme for sender-side transmission records comprises
   mapping the status of correct receipt not confirmed onto each second data unit that contains at least one data symbol that belonged to a first data unit that was associated with the status of correct receipt not confirmed, and
   mapping the status of correct receipt confirmed onto each second data unit that completely contains data symbols that all belonged to first data units that were associated with the status of correct receipt confirmed, and said mapping scheme for receiver-side transmission records comprises
   mapping the status of not correctly received onto each second data unit that contains at least one data symbol that belonged to a first data unit that was associated with the status of not correctly received, and
   mapping the status of correctly received onto each second data unit that completely contains data symbols that all belonged to first data units that were associated with the status of correctly received.

3. A method of controlling a communication device to operate as a sending peer of a connection provided by a predetermined communication layer for transmitting a sequence of data symbols, a feedback mechanism being implemented for said connection, according to which a receiving peer of the connection sends feedback messages to a sending peer of the connection, said feedback messages comprising information on the receipt of data units sent over the connection, said method comprising:

conducting said transmission by dividing said sequence of data symbols into a sequence of first data units on the basis of a first data unit generation scheme, controlling the sending of said first data units to a receiving peer of said connection on the basis of a first sender-side transmission record of data units in which each data unit is associated with sender-side transmission status information, modifying said transmission of data symbols by:

obtaining a reference data symbol in the sequence of data symbols, dividing the data symbols following said reference data symbol in the sequence of data symbols into a sequence of second data units on the basis of a second data unit generation scheme, generating a second sender-side transmission record by mapping said sender-side transmission status information associated with data units in said first sender-side transmission record onto said second data units in accordance with a predetermined mapping scheme for sender-side transmission records, and controlling the sending of said second data units on the basis of said second sender-side transmission record.

4. The method of claim 3, wherein said sender-side transmission status information distinguishes between at least the statuses of correct receipt confirmed, and correct receipt not confirmed, and said mapping scheme for sender-side transmission records comprises mapping the status of correct receipt not confirmed onto each second data unit that contains at least one data symbol that belonged to a first data unit that was associated with the status of correct receipt not confirmed, and mapping the status of correct receipt confirmed onto each second data unit that completely contains data symbols that all belonged to first data units that were associated with the status of correct receipt confirmed.

5. The method of claim 4, wherein said sender-side transmission status information further distinguishes the status of correct receipt not confirmed into sent and correct receipt not confirmed, and not sent, and said mapping scheme for sender-side transmission records comprises mapping the status of not sent onto each second data unit that contains at least one data symbol that belonged to a first data unit that was associated with the status of not sent, and mapping the status of sent and correct receipt not confirmed onto each second data unit that contains at least one data symbol that belonged to a first data unit that was associated with the status of sent and correct receipt not confirmed and that contains no data symbols that belonged to a first data unit that was associated with the status of not sent.

6. The method of claim 3, wherein said first data unit generation scheme comprises generating said first data units with a predetermined first size, and said second data unit generation scheme comprises generating said second data units with a predetermined second size, said second size being different from said first size.

7. The method of claim 3, wherein said modifying of said transmission is triggered by a reconfiguration of said connection or a handover of said connection to a new receiving peer, and said communication device continues to operate as said sending peer but performs the transmission control of said second data units on the basis of said second sender-side transmission record after said reconfiguration or handover.

8. The method of claim 3, wherein said modifying of said transmission is triggered by a handover of said connection to a second sending peer, said communication device also operating as said second sending peer, where said second sending peer performs the transmission control of said second data units on the basis of said second sender-side transmission record after said handover.

9. The method of claim 3, wherein said communication device obtains said reference data symbol by receiving a message sent from the receiving-side of said connection.

10. The method of claim 3, wherein said communication device uses a sliding window technique for transmission control, and where the initial low end of the sliding window with respect to the sequence of data symbols, used for transmission control of said second data units on the basis of said second send record and said second receive record, is said reference data symbol.

11. The method of claim 3, wherein said sender-side transmission status information comprises information on one or more of a time value associated with a data unit, a number of retransmission attempts associated with a data unit, reliability associated with a data unit, and priority associated with a data unit.

12. The method of claim 3, wherein said data symbols are provided to said communication layer in the form of protocol data units of a higher layer, and where said identifying of said reference symbol comprises determining the first data symbol of the higher layer protocol data unit that follows the last higher layer protocol data unit of which all data symbols were correctly received by said receiving peer as said reference data symbol.

13. The method of claim 3, wherein the number of data symbols in each first data unit is variable, and said communication device is arranged to receive information from the receiving-side of the connection on which first data units the receiver-side has not correctly received, and in response thereto transmits to the receiver-side of the connection information on how many data symbols are contained in each of the first data units that said receiver-side has not correctly received.

14. A method of controlling a communication device to operate as a sending peer of a connection provided by a predetermined communication layer for transmitting a sequence of data symbols, a feedback mechanism being implemented for said connection, according to which a receiving peer of the connection sends feedback messages to a sending peer of the connection, said feedback messages comprising information on the receipt of data units sent over connection, said method comprising:

receiving from a previous sending peer of said connection a sequence of data symbols and a first sender-side transmission record of data units that were generated in accordance with a first data unit generation scheme, in which record each data unit is associated with sender-side transmission status information, obtaining a reference data symbol in the sequence of data symbols, dividing the data symbols following said reference data symbol in the sequence of data symbols into a sequence of second data units on the basis of a second data unit generation scheme, generating a second sender-side transmission record by mapping said sender-side transmission status information associated with data units in said first sender-side transmission record onto said data units in accordance with a predetermined mapping scheme for sender-side transmission records, and controlling the sending of said second data units over said connection on the basis of said second sender-side transmission record.

15. The method of claim 14, wherein said sender-side transmission status information distinguishes between at least the statuses of correct receipt confirmed, and correct receipt not confirmed, and said mapping scheme for sender-side transmission records comprises mapping the status of correct receipt not confirmed onto each second data unit that contains at least one data symbol that belonged to a first data unit that was associated with the status of correct receipt not confirmed, and mapping the status of correct receipt confirmed onto each second data unit that completely contains data symbols that all belonged to first data units that were associated with the status of correct receipt confirmed.

16. The method of claim 15, wherein said sender-side transmission status information further distinguishes the status of correct receipt not confirmed into sent and correct receipt not confirmed, and not sent, and said mapping scheme for sender-side transmission records comprises mapping the status of not sent onto each second data unit that contains at least one data symbol that belonged to a first data unit that was associated with the status of not sent, and mapping the status of sent and correct receipt not confirmed onto each second data unit that contains at least one data symbol that belonged to a first data unit that was associated with the status of sent and correct receipt not confirmed and that contains no data symbols that belonged to a first data unit that was associated with the status of not sent.

17. The method of claim 14, wherein said first data unit generation scheme comprises generating said first data units with a predetermined first size, and said second data unit generation scheme comprises generating said second data units with a predetermined second size, said second size being different from said first size.

18. The method of claim 14, wherein said communication device obtains said reference data symbol by receiving a message sent from the receiving-side of said connection.

19. The method of claim 14, wherein said communication device uses a sliding window technique for transmission control, and where the initial low end of the sliding window with respect to the sequence of data symbols, used for transmission control of said second data units on the basis of said second sender-side transmission record, is said reference data symbol.

20. The method of claim 14, wherein said sender-side transmission status information comprises information on one or more of a time value associated with a data unit, a number of retransmission attempts associated with a data unit, reliability associated with a data unit, and priority associated with a data unit.

21. The method of claim 14, wherein said data symbols are provided to said communication layer in the form of protocol data units of a higher layer, and where said obtaining of said reference symbol comprises determining the first data symbol of the higher layer protocol data unit that follows the last higher layer protocol data unit of which all data symbols were correctly received by said receiving peer as said reference data symbol.

22. The method of claim 14, wherein the number of data symbols in each first data unit is variable, and said communication device is arranged to receive information from the receiving-side of the connection on which first data units the receiver-side has not correctly received, and in response thereto transmits to the receiver-side of the connection information on how many data symbols are contained in each of the first data units that said receiver-side has not correctly received.

23. A method of controlling a communication device to operate as a receiving peer of a connection provided by a predetermined communication layer for transmitting a sequence of data symbols, a feedback mechanism being implemented for said connection, according to which a receiving peer of the connection sends feedback messages to a sending peer of the connection, said feedback messages comprising information on the receipt of data units sent over connection, and where the sending peer divides said sequence of data symbols into a sequence of first data units on the basis of a first data unit generation scheme, and controls the sending of said first data units to a receiving peer of said connection on the basis of a first sender-side transmission record of data units in which each data unit is associated with sender-side transmission status information, said method comprising: conducting said transmission by keeping a first receiver-side transmission record of first data units in which each first data unit is associated with receiver-side transmission status information, and reassembling said sequence of data symbols on the basis of said first receiver-side transmission record, modifying said transmission of data symbols by:

obtaining a reference data symbol in the sequence of data symbols, dividing the data symbols following said reference data symbol in the sequence of data symbols into a sequence of second data units on the basis of a second data unit generation scheme, generating a second receiver-side transmission record by mapping said receiver-side transmission status information associated with data units in said first receiver-side transmission record onto said second data units in accordance with a predetermined mapping scheme for receiver-side transmission records, and reassembling said sequence of data symbols on the basis of said second receiver-side transmission record.

24. The method of claim 23, wherein said receiver-side transmission status information distinguishes between at least the statuses of correctly received, and not correctly received, and said mapping scheme for receiver-side transmission records comprises mapping the status of not correctly received onto each second data unit that contains at least one data symbol that belonged to a first data unit that was associated with the status of not correctly received, and mapping the status of correctly received onto each second data unit that completely contains data symbols that all belonged to first data units that were associated with the status of correctly received.

25. The method of claim 23, wherein said first data unit generation scheme comprises generating said first data units with a predetermined first size, and said second data unit generation scheme comprises generating said second data units with a predetermined second size, said second size being different from said first size.

26. The method of claim 23, wherein said modifying of said transmission is triggered by a reconfiguration of said connection or a handover of said connection to a new sending peer, and said communication device continues to operate as said receiving peer but performs the reassembling of said sequence of data symbols on the basis of said second receiver-side transmission record after said reconfiguration or handover.

27. The method of claim 23, wherein said modifying of said transmission is triggered by a handover of said connection to a second receiving peer, said communication device also operating as said second receiving peer, where said second receiving peer performs the reassembling of said sequence of data symbols on the basis of said second receiver-side transmission record after said handover.

28. The method of claim 23, wherein said reference data symbol is obtained from a procedure conducted by said communication device.

29. The method of claim 28, wherein said data symbols are provided to said communication layer in the form of protocol data units of a higher layer, and where said procedure for obtaining of said reference symbol comprises determining as said reference data symbol the first data symbol of the higher layer protocol data unit that follows the last higher layer protocol data unit of which all data symbols were correctly received by said communication device.

30. The method of claim 23, wherein said receiver-side transmission status information comprises information on one or more of
 a time value associated with a data unit,
 a number of retransmission attempts associated with a data unit,
 reliability associated with a data unit, and priority associated with a data unit.

31. The method of claim 23, wherein the number of data symbols in each first data unit is variable, and where prior to said step of generating a second receiver-side transmission record, the communication device is arranged to receive from the sender-side of the connection information on how many data symbols are contained in each of the first data units that said communication device has not correctly received.

32. A method of controlling a communication device to operate as a receiving peer of a connection provided by a predetermined communication layer for transmitting a sequence of data symbols, a feedback mechanism being implemented for said connection, according to which a receiving peer of the connection sends feedback messages to a sending peer of the connection, said feedback messages comprising information on the receipt of data units sent over connection, said method comprising:
 receiving from a previous receiving peer of said connection a sequence of data symbols and a first receiver-side transmission record of data units that were generated in accordance with a first data unit generation scheme, in which record each data unit is associated with receiver-side transmission status information,
 obtaining a reference data symbol in the sequence of data symbols,
 dividing the data symbols following said reference data symbol in the sequence of data symbols into a sequence of second data units on the basis of a second data unit generation scheme,
 generating a second receiver-side transmission record by mapping said receiver-side transmission status information associated with data units in said first receiver-side transmission record onto said second data units in accordance with a predetermined mapping scheme for receiver-side transmission records, and
 reassembling said sequence of data symbols on the basis of said second receiver-side transmission record.

33. The method of claim 32, wherein said receiver-side transmission status information distinguishes between at least the statuses of
 correctly received, and
 not correctly received, and said mapping scheme for receiver-side transmission records comprises
 mapping the status of not correctly received onto each second data unit that contains at least one data symbol that belonged to a first data unit that was associated with the status of not correctly received, and
 mapping the status of correctly received onto each second data unit that completely contains data symbols that all belonged to first data units that were associated with the status of correctly received.

34. The method of claim 32, wherein said first data unit generation scheme comprises generating said first data units with a predetermined first size, and said second data unit generation scheme comprises generating said second data units with a predetermined second size, said second size being different from said first size.

35. The method of claim 32, wherein said reference data symbol is obtained from a procedure conducted by said communication device.

36. The method of claim 35, wherein said data symbols are provided to said communication layer in the form of protocol data units of a higher layer, and where said procedure for obtaining of said reference symbol comprises determining as said reference data symbol the first data symbol of the higher layer protocol data unit that follows the last higher layer protocol data unit of which all data were correctly received by said communication device.

37. The method of claim 32, wherein said receiver-side transmission status information comprises information on one or more of
 a time value associated with a data unit,
 a number of retransmission attempts associated with a data unit,
 reliability associated with a data unit, and
 priority associated with a data unit.

38. The method of claim 32, wherein the number of data symbols in each first data unit is variable, and where prior to said step of generating a second receiver-side transmission record, the communication device is arranged to receive from the sender-side of the connection information on how many data symbols are contained in each of the first data units that said communication device has not correctly received.

39. A method of controlling a communication device to operate as a sending peer of a connection provided by a predetermined communication layer for transmitting a sequence of data symbols, a feedback mechanism being implemented for said connection, according to which a receiving peer of the connection sends feedback messages to a sending peer of the connection, said feedback messages comprising information on the receipt of data units sent over the connection, said method comprising conducting said transmission by dividing said sequence of data symbols into a sequence of first data units on the basis of a first data unit generation scheme, controlling the sending of said first data units to a receiving peer of said connection on the basis of a first sender-side transmission record of data units in which each data unit is associated with sender-side transmission status information, and modifying said transmission of data symbols by transferring to another communication device a sequence of data symbols and a sender-side transmission record, obtaining a reference data symbol in the sequence of data symbols, dividing the data symbols following said reference data symbol in the sequence of data symbols into a sequence of second data units on the basis of a second data unit generation scheme, generating a second sender-side transmission record by mapping said sender-side transmission status information associated with data units in said first sender-side transmission record onto said second data units in accordance with a predetermined mapping scheme for sender-side transmission records, and transferring to said other communication device said second sender-side transmission record.

40. The method of claim 39, wherein said sender-side transmission record transferred to said other communication device is said first sender-side transmission record.

41. A method of controlling a communication device to operate as a receiving peer of a connection provided by a predetermined communication layer for transmitting a sequence of data symbols, a feedback mechanism being implemented for said connection, according to which a receiving peer of the connection sends feedback messages to a sending peer of the connection, said feedback messages comprising information on the receipt of data units sent over the connection, said method comprising: conducting said transmission by receiving from a sending peer of said connection data units generated according to a predetermined data unit generation scheme, and reassembling said sequence of data symbols on the basis of a first receiver-side transmission record, and modifying said transmission of data symbols by transferring to another communication device a sequence of data symbols and a receiver-side transmission records obtaining a reference data symbol in the sequence of data symbols, dividing the data symbols following said reference data symbol in the sequence of data symbols into a sequence of second data units on the basis of a second data unit generation scheme, generating a second receiver-side transmission record by mapping said receiver-side transmission status information associated with data units in said first receiver-side transmission record onto said second data units in accordance with a predetermined mapping scheme for receiver-side transmission records, and transferring to said other communication device said second receiver-side transmission record.

42. The method of claim 41, wherein said receiver-side transmission record transferred to said other communication device is said first receiver-side transmission record.

* * * * *

UNITED STATES PATENT AND TRADEMARK OFFICE
CERTIFICATE OF CORRECTION

PATENT NO. : 7,489,705 B2 Page 1 of 1
APPLICATION NO. : 10/546432
DATED : February 10, 2009
INVENTOR(S) : Sachs et al.

It is certified that error appears in the above-identified patent and that said Letters Patent is hereby corrected as shown below:

In Column 23, Line 2, in Claim 39, delete "comprising" and insert -- comprising: --, therefor.

In Column 24, Line 16, in Claim 41, delete "records" and insert -- record, --, therefor.

Signed and Sealed this

Twentieth Day of October, 2009

David J. Kappos
*Director of the United States Patent and Trademark Office*